United States Patent [19]

Ogasawara

[11] 4,414,469

[45] Nov. 8, 1983

[54] AUTOMATIC FOCUSING APPARATUS WITH DETECTION ONLY WHEN THE LENS IS STATIONARY

[75] Inventor: Akira Ogasawara, Yokohama, Japan

[73] Assignee: Nippon Kogaku K.K., Tokyo, Japan

[21] Appl. No.: 321,076

[22] Filed: Nov. 13, 1981

[30] Foreign Application Priority Data

Nov. 18, 1980 [JP] Japan .............................. 55-162339
Aug. 20, 1981 [JP] Japan .............................. 56-130696

[51] Int. Cl.³ .............................................. G01S 1/36
[52] U.S. Cl. ................................... 250/201; 250/204; 354/25
[58] Field of Search ............. 250/201, 204; 354/25 R; 356/4

[56] References Cited

U.S. PATENT DOCUMENTS 4,264,810 4/1981 Utagawa et al. .................... 250/204

Primary Examiner—David C. Nelms
Assistant Examiner—Darwin R. Hostetter
Attorney, Agent, or Firm—Fitzpatrick, Cella, Harper & Scinto

[57] ABSTRACT

Automatic focusing apparatus includes a charge store type photo-sensor. Due to the use of the photo-sensor, the apparatus has an improved response to a substantial charge of an interval of control outputs by change in a time sequence of the control outputs and also has an improved response to a change in a time sequence of servo outputs and a substantial change in an interval of the servo outputs.

9 Claims, 9 Drawing Figures

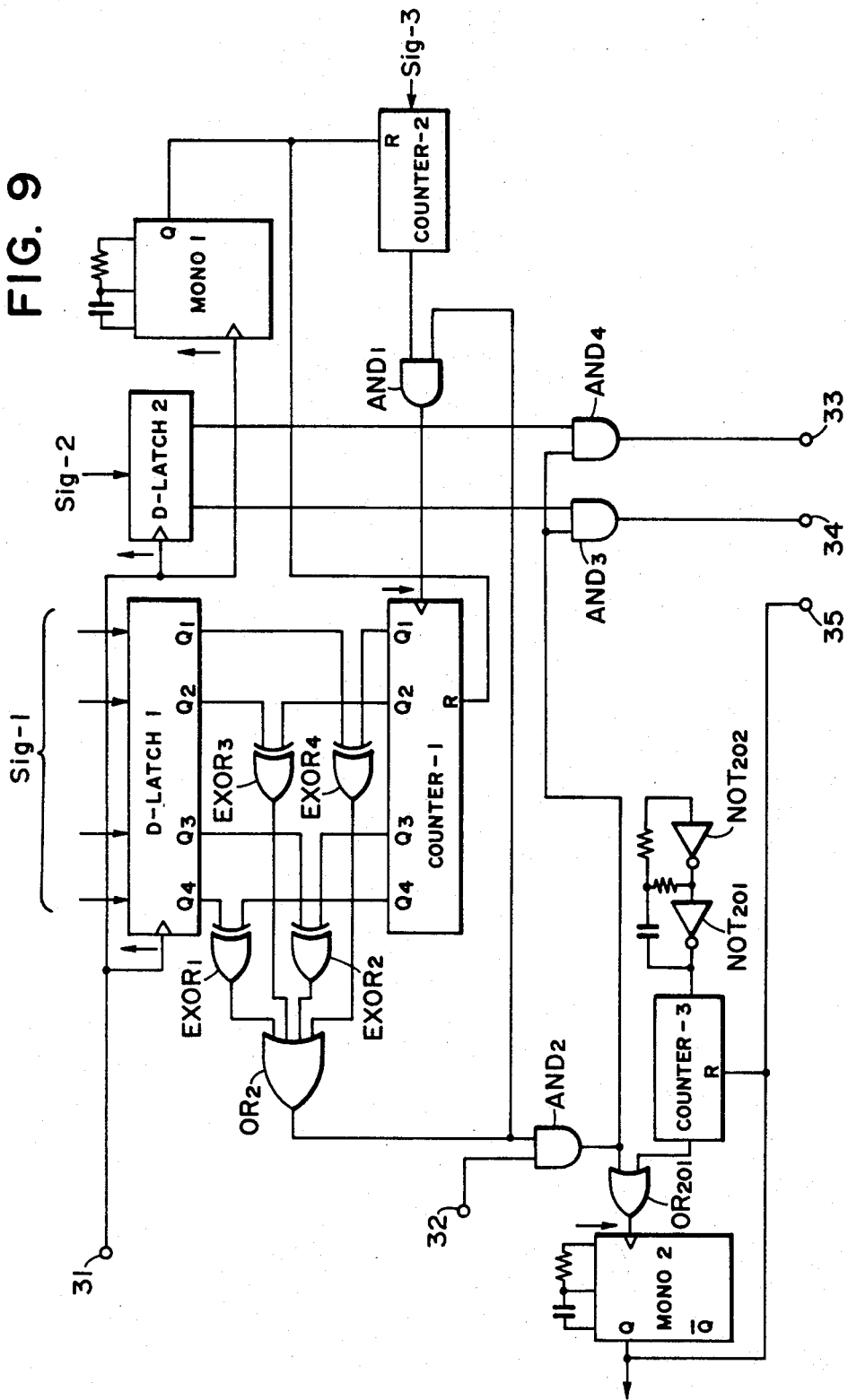

AUTOMATIC FOCUSING APPARATUS WITH DETECTION ONLY WHEN THE LENS IS STATIONARY

BACKGROUND OF THE INVENTION

Technology for detecting a distance to an object and controlling the amount of draw-out of an imaging lens has been proposed, for example, in Japanese Published Unexamined Patent Application 51-83524 based on U.S. patent application Ser. No. 529,573, and U.S. Pat. No. 4,264,810.

In the prior art, a photo-diode was used as a photo-sensor and a photo-current from the photo-diode was processed to produce an optical image signal for the automatic focusing operation. Since the photo-current is continuously produced, the optical image signal is also continuously produced so that the optical image signal can be used to directly servo-control the amount of draw-out of the lens.

On the other hand, as the semiconductor technology has been developed, a charge store type photo-sensor such as CCD has been put into practical use. Because of an advantage of a smaller photo-sensitive area than the photo-diode, the CCD has been noted as the photo-sensor of the automatic focusing device. However, since an output of the CCD photo-sensor is produced at every integration period, the servo-output for driving the lens is also time-serial and intermittent. In addition, since an automatic gain control (AGC) is usually carried out for the integration period in order to control the output of the CCD photo-sensor to an appropriate output level, a time interval of the servo-outputs significantly varies with the light quantity. Consequently, when the servo system is designed to respond to all of the serially generated servo-outputs, the servo system may oscillate and the lens may hunt.

SUMMARY OF THE INVENTION

It is an object of the present invention to provide an improved automatic focusing apparatus having a charge store type photo-sensor.

It is another object of the present invention to provide an automatic focusing apparatus having an improved response to a substantial change of an interval of control outputs by a change in a time sequence of the control outputs due to the use of the charge store type photo-sensor.

It is a further object of the present invention to provide an automatic focusing apparatus having an improved response to a change in a time sequence of servo-outputs due to the use of the charge store type photo-sensor and a substantial change in an interval of the servo-outputs due to an AGC.

BRIEF DESCRIPTION OF THE DRAWINGS

FIG. 9 shows another specific circuit diagram of the major portions of the apparatus shown in FIG. 4.

DETAILED DESCRIPTION OF THE PREFERRED EMBODIMENTS

The preferred embodiments of the present invention will now be explained in detail.

Figure 1:
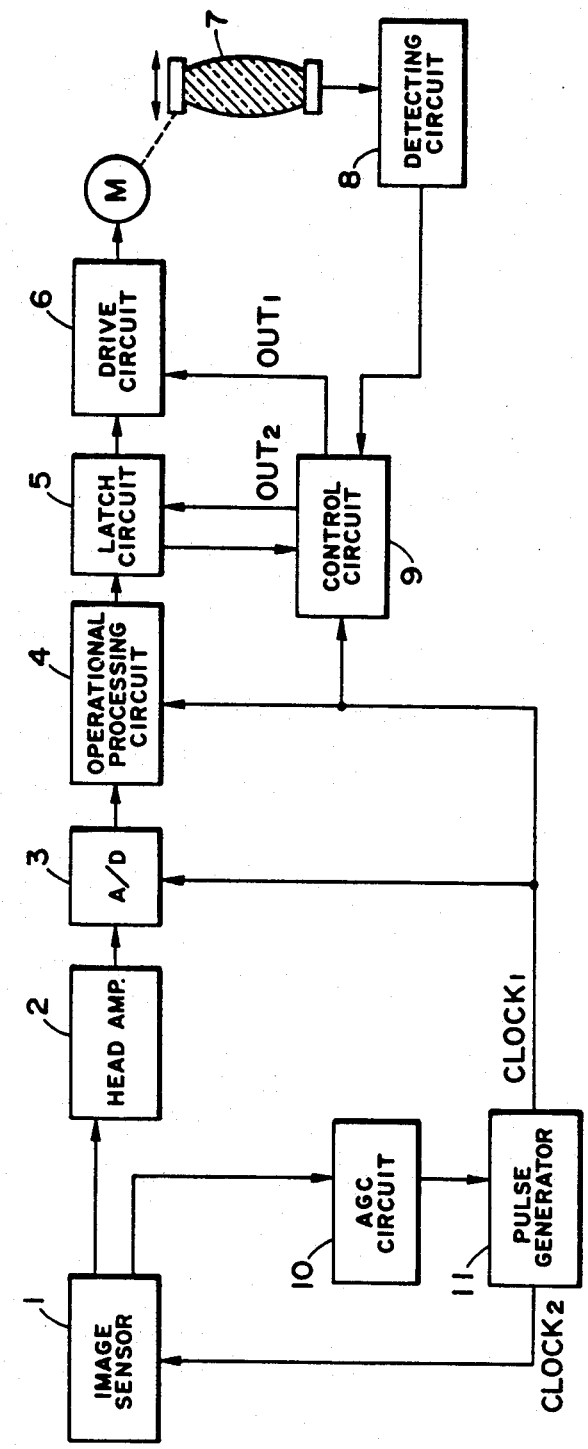
FIG. 1 shows a block diagram of one embodiment of an automatic focusing apparatus of the present invention.
Figure 2:
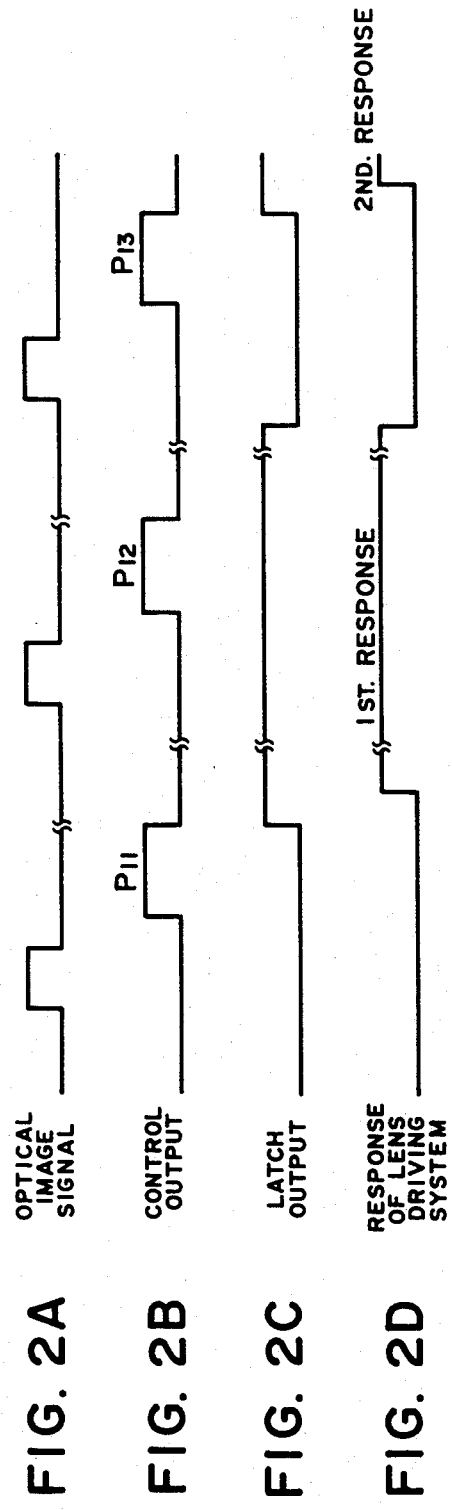
FIG. 2 shows a time chart for explaining the operation of the apparatus shown in FIG. 1.

Referring to FIGS. 1 and 2, a basic configuration of a first embodiment of the present invention and an operation thereof are explained. The apparatus shown in FIG. 1 comprises a charge store type image sensor 1 such as CCD, a head amplifier 2 and an A/D converter 3 for A/D converting an output of the head amplifier 2. The image sensor 1 includes a photoelectric cell array which is arranged on an effective focal plane of an imaging lens or on a focal plane of another focusing optical system which is operatively linked to the imaging lens with respect to focusing. The photoelectric cell array comprises a plurality of photoelectric elements which can store charges in accordance with the quantity of incident light. An operational processing circuit 4 receives control outputs including signals indicative of front focus, rear focus and focusing error from the output of the A/D converter 3 and digitally processes them and intermittently supplies the results to a latch circuit 5. Thus, the control outputs are intermittently updated. A drive circuit 6 is a power amplifier for driving a motor M which in turn drives a lens 7. A lens position detecting circuit 8 detects a displacement of the lens 7 driven by the motor M. A control circuit 9 compares a lens displacement signal from the detecting circuit 8 with the focusing error signal which is latched in the latch circuit 5, and when those signals are in a predetermined relationship, that is, when it is detected that the lens 7 has been displaced to a point of zero focusing error, the control circuit 9 produces a first output OUT 1 to stop the drive of the motor M by the drive circuit 6 and also produces a second output OUT 2 to allow the latch circuit 5 to read in the output of the operational processing circuit 4. An AGC circuit 10 detects the optical image signal from the image sensor 1 and produces an AGC output for controlling a charge storage time of the image sensor 1 in order to maintain the image signal from the image sensor 1 at a substantially constant level independently from the intensity of the incident light. The circuit 10 may be one disclosed in U.S. continuation application Ser. No. 258,763 based on parent U.S. application Ser. No. 105,271. A clock pulse generator 11 sequentially generates a clock pulse CLOCK 1 of a constant period which is applied to the A/D converter 3, the operational processing circuit 4 and the control circuit 9, and also generates a clock pulse CLOCK 2 having a variable period in accordance with the AGC output, which clock pulse is applied to the image sensor 1. The charge storage time of the image sensor 1 is controlled by the clock pulse CLOCK 2.

As described above, problems encountered when the CCD photo-sensor is used are that the control output from the operational processing circuit 4 is updated intermittently and the interval of updating significantly varies with the AGC output.

If a circuit configuration is such that the lens drive system directly follows the control output, the following disadvantage is encountered. When the optical image signal is produced from the image sensor 1 as shown in FIG. 2A, the operational processing circuit 4 processes it to produce control outputs $P_{11}$, $P_{12}$ ... representing the amounts of draw-out of the lens as shown in FIG. 2B. The latch circuit 5 receives the control outputs from the operational processing circuit 4 and produces a latch output as shown in FIG. 2C. The lens drive system responds to the latched output to drive the motor M as shown in FIG. 2D. As seen from FIGS. 2B and 2D, the response of the lens drive system to the control output $P_{11}$ which precedes in the time sequence continues until after the occurrence of the control output $P_{12}$ which follows in the time sequence. If the circuit configuration is such that the second response after the completion of the first response is started in response to the previously generated control output $P_{12}$, the lens drive system may oscillate.

In the present embodiment, therefore, the control circuit 9 is provided to allow the latch circuit 5 to read in the control output from the operational control circuit 4 only after the displacement signal of the lens 7 detected by the lens position detecting circuit 8 has reached a point indicated by the control output (i.e. latch output). As a result, the second response of the lens drive system is started in response to the control output $P_{13}$.

Figure 3:
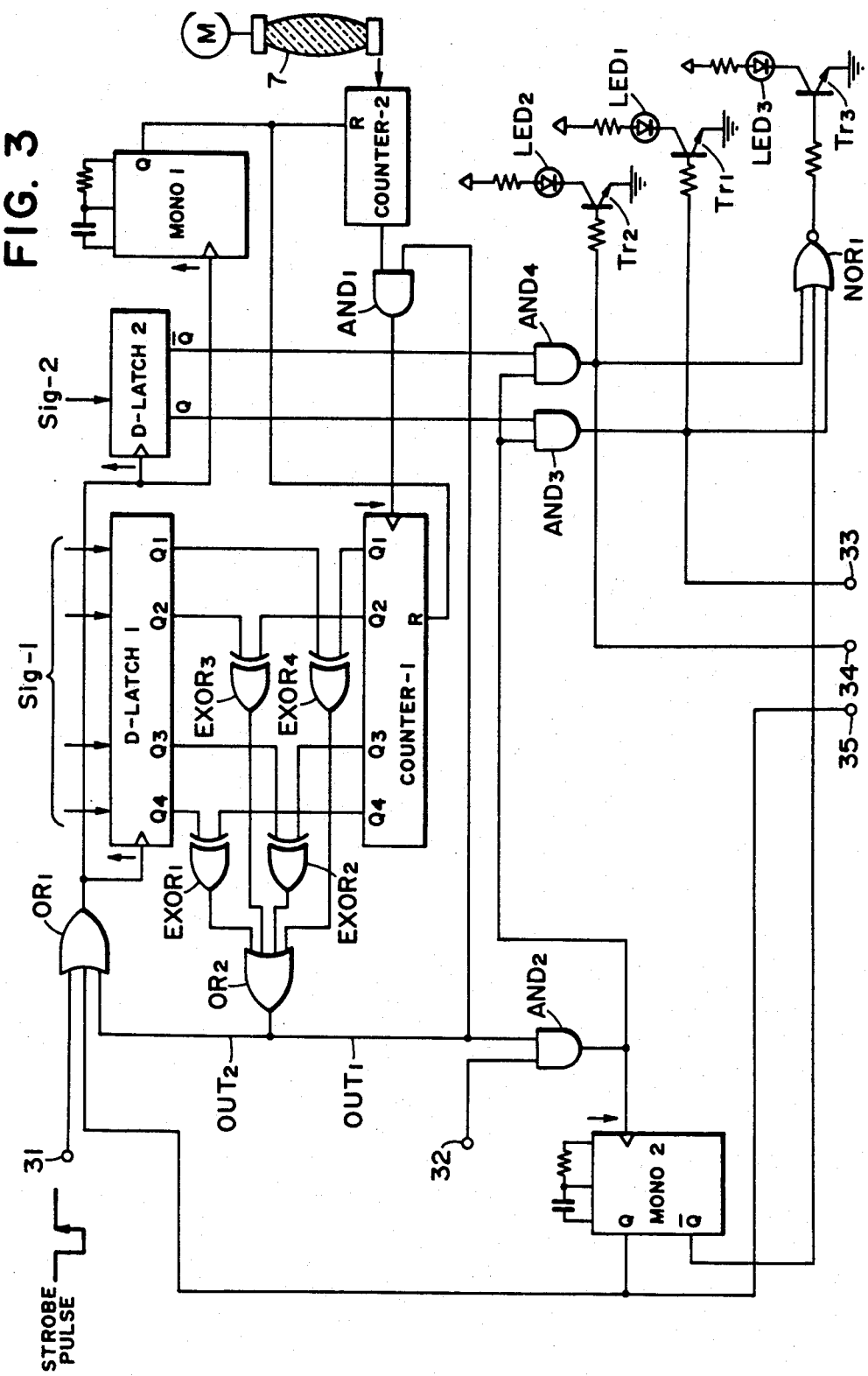
FIG. 3 shows a specific circuit diagram of major portions of the apparatus shown in FIG. 1.

Referring to FIG. 3, exemplary circuits of the latch circuit 5, the control circuit 9 and the lens position detecting circuit 8 are explained. In the illustrated embodiment, the data read-in of the latch circuit is controlled by a one-channel focusing error signal.

The control outputs from the operational processing circuit 4 include a 4-bit binary coded signal Sig-1 representing the focusing error and a 1-bit binary coded direction signal Sig-2 representing the front focus or the rear focus. The signal Sig-1 is applied to a first latch circuit D-Latch 1 and the signal Sig-2 is applied to a second latch circuit D-Latch 2.

A strobe pulse is applied to an input terminal 31, thence to an OR gate OR 1 which constructs a strobe circuit, thence to strobe input terminals of the first latch circuit D-Latch 1, the second latch circuit D-Latch 2 and a monostable multivibrator MONO 1. The first and second latch circuits D-Latch 1 and D-Latch 2 latch the signals Sig-1 and Sig-2, respectively, at the rising edge of the strobe pulse. The multivibrator MONO 1 produces a reset pulse at an output terminal Q upon the receipt of the strobe pulse, which reset pulse is applied to reset terminals R of binary counters Counter 1 and Counter 2, respectively.

The displacement of the lens 7 driven by the motor M is detected by generating pulses synchronized with the rotation of the motor M by a photo-interrupter and counting the synchronized pulses by the counter Counter 2. The output of the counter Counter 2 is applied to the counter Counter 1 through an AND circuit AND 1. The counter Counter 2 frequency divides the pulse synchronized with the rotation of the motor M and supplies the frequency-divided output to the counter Counter 1. In this manner, the number of pulses counted by the counter Counter 2 is normalized so as to comply with the output of the latch circuit D-Latch 1. The ratio of the frequency division is determined depending on a gear ratio of gears between the lens and the motor.

Exclusive OR circuits EXOR 1—EXOR 4 and an OR gate OR 2 from a coincidence circuit. When the parallel outputs of the latch circuit D-Latch 1 and the counter Counter 2 are equal, the output of the OR gate OR 2 changes from "H" level to "L" level. The output of the OR gate OR 2 is divided into a first output OUT 1 and a second output OUT 2.

An input terminal 32 receives a shutter release signal or focus lock signal and it is at "H" level when shutter release or focus lock is not desired. When the signal at the input terminal 32 is at "H" level, an AND gate AND 2 gates the output of the OR gate OR 2 to AND gates AND 3 and AND 4 and a strobe input terminal of a monostable multivibrator MONO 2. The AND gates AND 3 and AND 4 receive the outputs Q and $\bar{Q}$ of the latch circuit D-Latch 2, respectively. When the signal Sig-2 indicates the front focus, the outputs Q and $\bar{Q}$ of the latch circuit D-Latch 2 are "L" and "H", respectively, and when to signal Sig-2 indicates the rear focus, the outputs Q and $\bar{Q}$ are "H" and "L", respectively.

The outputs of the AND gates AND 3 and AND 4 are supplied to motor control output terminals 33 and 34, respectively. When the output of the AND gate AND 2 is "H" and the outputs Q and $\bar{Q}$ of the latch circuit D-Latch 2 are "L" and "H", respectively, the AND gate AND 3 produces the "L" output and the AND gate AND 4 produces the "H" output, which outputs are supplied to a motor feeding bridge circuit through the terminals 33 and 34 to drive the motor forwardly to drive the lens in one direction. When the outputs Q and $\bar{Q}$ of the latch circuit D-Latch 2 are "H" and "L", respectively, the relation is reversed and the motor is driven reversely to drive the lens 7 in the other direction.

When the output of the AND gate AND 2 is "L", the outputs Q and $\bar{Q}$ of the multivibrator MONO 2 assume "H" and "L", respectively. The output Q of the multivibrator MONO 2 is applied to the OR gate OR 1 while the output $\bar{Q}$ is supplied to a motor control output terminal 35. When the signal at the motor control output terminal 35 is "L", an electromagnetic brake circuit (not shown) is actuated to shunt the motor M. Accordingly, the multivibrator MONO 2 functions as a motor stopping brake circuit.

When the output of the AND gate AND 3 is "H", a transistor Tr1 is turned on to fire a light emitting diode LED 1 to indicate the front focus. When the output of the AND gate AND 4 is "H", a transistor $T_r2$ is turned on to fire a light emitting diode LED 2 to indicate the rear focus. When the focus error reaches zero, a NOR gate NOR 1 responds to the "L" outputs of the AND gates AND 3 and AND 4 and the "L" output at the $\bar{Q}$ output terminal of the multivibrator MONO 2 which outputs are present when the output of the AND gate AND 2 assumes "L", to produce an "H" output to turn on a transistor $T_r3$. Thus, when the focus error has reached zero and the electromagnetic brake has been applied to the motor M, a light emitting diode LED 3 is fired.

The operation of the circuit is now briefly explained. When the signals Sig-1 and Sig-2 are supplied together with the strobe pulse, the latch circuits D-Latch 1 and D-Latch 2 latch the focus error and the polarity of the front/rear focus signal, respectively, at the rising edge of the strobe pulse. Immediately following this, the multivibrator MONO 1 produces the reset pulse to reset the contents of the counters Counter 1 and Counter 2 to zero. Since the exclusive OR gates EXOR 1—EXOR 4 produce the "L" outputs when the bits of the latch circuit D-Latch 1 are equal to the bits of the counter Counter 1, the output of the OR gate OR 2 changes from "L" to "H" when all of the bits of the latch circuit D-Latch 1 are not "0", that is, when the focus error is not zero. Thus, the output of the OR gate OR 2 is "H" when the focus error is present to prevent the strobe pulse from passing through the OR gate OR 1 to inhibit the latch operations of the latch circuits D-Latch 1 and D-Latch 2. The output of the OR gate OR 2 enables the AND gates AND 3 and AND 4 through the AND gate AND 2. Then, based on the front/rear focus information latched in the latch circuit D-Latch 2, the direction of of lens drive is indicated to the servo motor M.

The rotation of the servo motor M is converted to the synchronized pulses by the photo-interrupter so that the count of the synchronized pulses in the counter Counter 2 represents the amount of draw-out of the lens 7. When the output of the OR gate OR 2 assumes "H" to start the servo control, the synchronized pulses are supplied to the counter Counter 1 through the AND gate AND 1. When the count in the counter Counter 1 reaches the content of the latch circuit D-Latch 1, the output of the OR gate OR 2 changes from "H" to "L". Then, the multivibrator MONO 2 is enabled to produce the "L" brake pulse at the output terminal $\bar{Q}$ to apply the electromagnetic brake to the motor M, and the outputs of the AND gates AND 3 and AND 4 assume "L" levels, respectively, to stop the motor M. Although the output of the OR gate OR 2 assumes the "L" level, the strobe pulse cannot pass through the OR gate OR 1 because the output Q of the multivibrator MONO 2 is "H". Accordingly, now latching operations of the latch circuits D-Latch 1 and D-Latch 2 are inhibited until the outputs Q and $\bar{Q}$ of the multivibrator MONO 2 assume the "L" level and the "H" level, respectively, (release of the electromagnetic brake) a predetermined time after the multivibrator MONO 2 has been enabled. Consequently, the control signal $P_{12}$ shown in FIG. 2 is not read in.

After the predetermined time period, the OR gate OR 1 is enabled to allow the read-in of the data latched in the latch circuits D-Latch 1 and D-Latch 2 so that the control signal $P_{13}$ shown in FIG. 2 is read in.

In the first embodiment thus far described, the second movement of the lens is allowed in response to the control output after the completion of the movement of the lens initiated in response to the first response, in order to prevent the oscillation of the servo system. In the first embodiment, however, there is a possibility that the control output immediately following the first response is based on the optical image signal generated immediately before the completion of the movement of the lens that has been initiated by the first response. Accordingly, it is necessary to prevent information during the movement of the lens from entering the control output. This is attained in a second embodiment of the present invention which will now be explained.

Figure 4:
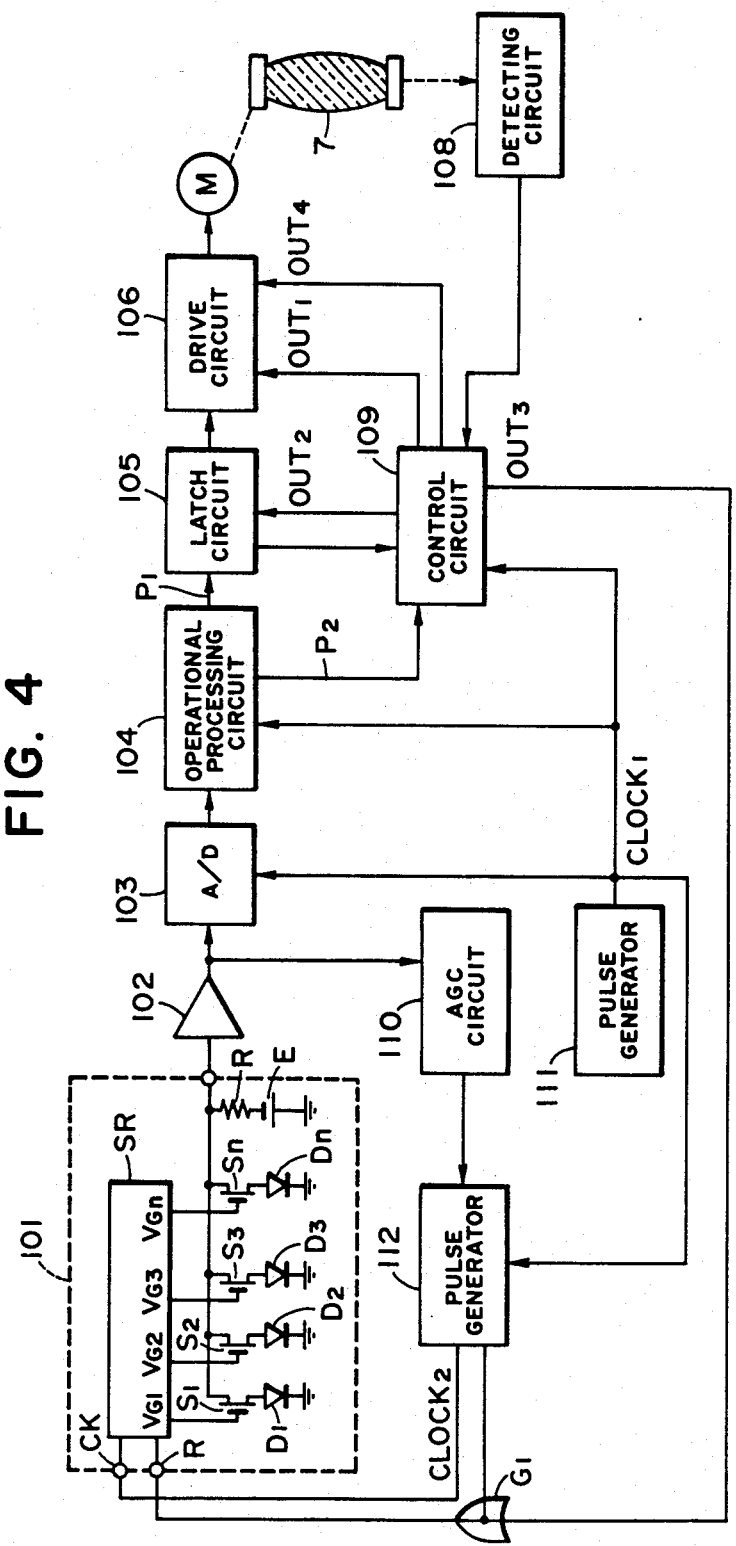
FIG. 4 shows a block diagram of a second embodiment of the apparatus of the present invention.

In the second embodiment shown in FIG. 4, a MOS image sensor is used as the charge store type image sensor. The image sensor 101 receives light from an object through a lens 7. The image sensor 101 includes an array of photo-diodes $D_1-D_n$ arranged in a predetermined relation to convert the object light pattern to electrical signals. The photo-diodes are connected to a head amplifier 102 through MOSFET address switches $S_1-S_n$, which are connected to output stages $VG_1-VG_n$ of a scan circuit which comprises a shift register SR.

Each of the photo-diodes and one corresponding address switch and one corresponding shift register stage are allotted to each bit of the MOS image sensor 101. Let us consider particularly the photo-diode $D_2$. When the address switch $S_2$ is turned on by a scan pulse from the output stage $VG_2$ of the scan circuit SR, the photo-diode $D_2$ is reverse-biased through an external power supply E and a resistor R. As a result, a capacitor (pn junction) of the photo-diode $D_2$ is charged. The photo-diode $D_2$ is kept reverse-biased for one scan period until the scan pulse from the output stage $VG_2$ of the shift register SR terminates and the address switch $S_2$ is turned off and again turned on. When light is directed to the reversebiased photo-diode $D_2$, a discharge current flows in the photo-diode $D_2$ so that the charge stored in the capacitor is reduced in proportion to the quantity of the incident light. Since the last charge is again charged by the external power supply E when the address switch $S_2$ is next turned on, the charging current represents an optical image signal. In this manner the photo-diode integrates the incident light over one scan period to produce the optical image signal. Accordingly, the longer the scan period is, the more does the integration amount of the photo-diode for a given intensity of incident light increase and the more does an apparent sensitivity increase.

An operational processing circuit 104 receives an output of an A/D converter 103 to intermittently produce a control output $P_1$ similar to that of the first embodiment and supplies it to a latch circuit 105. The operational processing circuit 104 also applies a strobe pulse $P_2$ to a control circuit 109 in synchronism with the control output $P_1$. The control circuit 109 compares a focus error signal latched in the latch circuit 105 with a lens displacement signal from a lens position detecting circuit 108, and when the lens 7 is displaced to a point of zero focus error the control circuit 109 produces a first output OUT 1 to stop the drive of a motor M. If the stop of the movement of the lens 7 is detected while the strobe pulse $P_2$ is applied, the control circuit 109 produces a second output OUT 2 to allow the latch circuit 105 to read in the data. The control circuit 109 further produces a brake output OUT 4 of a predetermined duration in synchronism with the first output OUT 1 to trigger the rapid stop of the motor M. When the stop of the movement of the lens 7 is detected, the control circuit 109 further produces a third output OUT 3 which is applied to a reset terminal R of the shift register SR. The stop of the movement of the lens may be detected by movement detecting means mounted in the lens system or the brake output OUT 4 may be detected where the lens is immediately stopped by the brake output OUT 4. In the present embodiment, for the sake of convenience, the third output OUT 3 is produced simultaneously with or slightly later than the brake output OUT 4 (while taking a time delay from the stop of the motor drive to the actual stop of the lens 7 into consideration). An AGC circuit 110 produces an AGC output to control a charge storage time of the image sensor 101 as is the case of the first embodiment. When a scan line of optical image signals have been transferred, the AGC circuit 110 produces a reset signal, which is supplied to the reset terminal R of the shift register SR through a wired OR gate G1. A clock pulse generator 111 generates a clock pulse CLOCK 1 which is applied to the A/D converter 103, the operational processing circuit 104 and the control circuit 109. A pulse generator 112 responds to the clock pulse CLOCK 1 to generate a clock pulse CLOCK 2 of variable period in accordance with the AGC output, which clock pulse CLOCK 2 is applied to the image sensor 101. The charge storage time of the image sensor 101 is controlled by the clock pulse CLOCK 2.

The operation of the circuit is now explained with reference to FIGS. 5A to 5I. The optical image signals equal in number to the number of bits are sequentially sampled from the image sensor 101 in each scan period. Those optical image signals are supplied to the operational processing circuit 104 in a unit. FIG. 5A shows the unit of optical image signals as one pulse waveform. The operational processing circuit 104 sequentially receives the units of optical image signals and produces the control outputs $P_1$, which are produced in synchronism with the scan period of the image sensor 101 as shown in FIG. 5B. The operational processing circuit 104 also produces the strobe pulses $P_2$ which are synchronized with the control outputs $P_1$ as shown in FIG. 5C.

Figure 5:
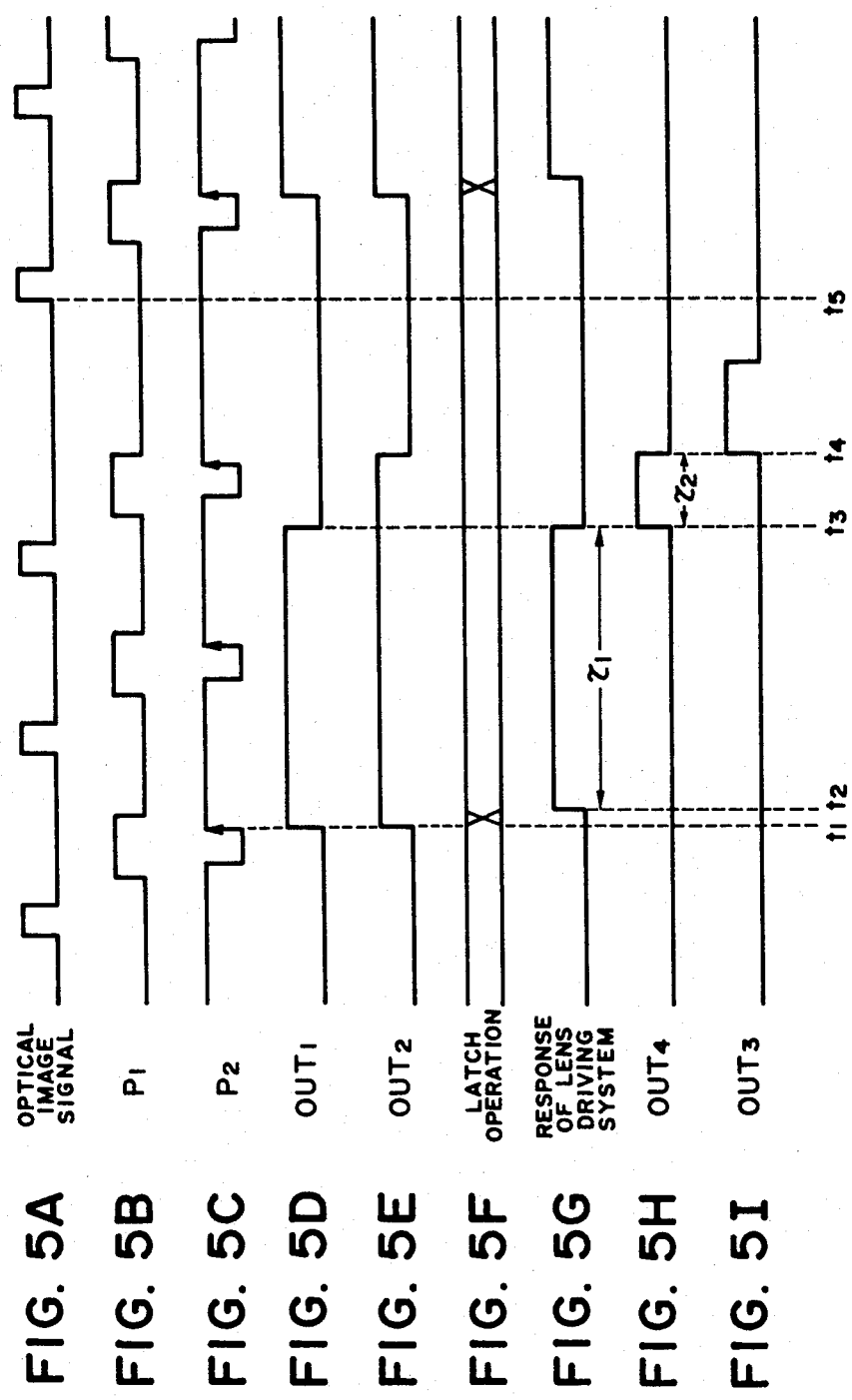
FIG. 5 shows a time chart for explaining the operation of the apparatus shown in FIG. 4.

When the strobe pulse $P_2$ is applied to the control circuit 109 and if the motor M is not rotated (the lens 7 is stopped) at that time, the control circuit 109 produces the "H" level output OUT 2 as shown in FIG. 5E to render the latch circuit 105 to latch the control output $P_1$ which is present when the strobe pulse is applied and inhibit to read-in of the subsequent control outputs (FIG. 5F). This time point is indicated by $t_1$ in FIG. 5. The control circuit 109 also produces the "H" level output OUT 1 as shown in FIG. 5D to allow a drive circuit 106 to drive the motor M. From a time point $t_2$ shown in FIG. 5, the lens 7 is driven toward a focal point in accordance with the control output P1.

At a time point $t_3$ which occurs a time $T_1$ later than the time point $t_2$, if the focus error signal and the lens displacement signal are in a predetermined relation, the first output OUT 1 of the control circuit 109 changes to "L" level to prevent the drive of the motor M and the control circuit 109 produces the brake output OUT 4 for a predetermined time period $T_2$. The rotaion status of the motor M is shown in FIG. 5G and the waveform of the brake output OUT 4 is shown in FIG. 5H. The motor M is thus electromagnetically braked to rapidly stop its rotation to terminate the drive of the lens 7. When the brake output OUT 4 terminates at a time point $t_4$, the second output OUT 2 of the cotrol circuit 109 changes to "L" level to allow the latch circuit 5 to read in the control output $P_1$. The third output OUT 3 of the control circuit 109 assumes the "H" level for a predetermined time period so that the output stages $VG_1$-$VG_n$ of the shift register SR change to "H" to turn on the address switches $S_1$-$S_n$. As a result, the photo-diodes $D_1$-$D_n$ charge the capacitors to complete the resetting operation. The shift register SR then resumes the scan. Accordingly, the operational processing circuit 104 processes the control output based on the optical image signal in the rest state of the lens movement (e.g. the optical image signal generated at a time point $t_5$ in FIG. 5). Consequently, since the information during the movement of the lens is not mixed with the control output, undesired operation such as hunting of the lens is prevented.

The above operation is repeated until focus lock or shutter release is effected so that the lens 7 is exactly positioned to the focusing position. When the precision of detection and the precision of the automatic focusing operation are sufficiently high, the lens 7 can be positioned to the exact focusing position in one run of operation. However, in order to present a freedom in selecting an object, the above operation is repeated by periodically resetting the image sensor 101 by the reset pulse of the AGC circuit 110 until the focus lock or the shutter release is effected.

Figure 6:
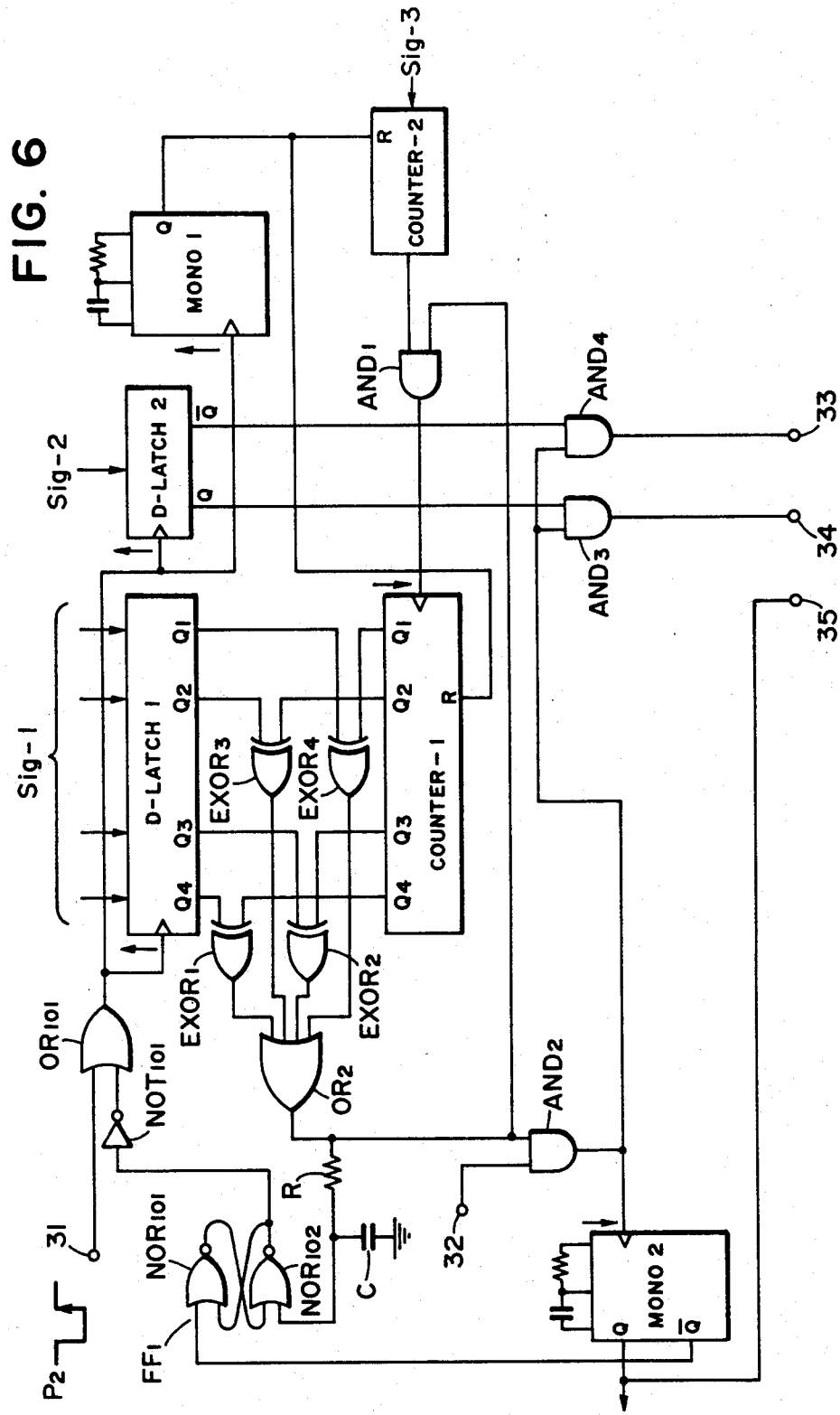
FIG. 6 shows a specific circuit diagram of major portions of the apparatus shown in FIG. 4.

Referring to FIG. 6, specific circuits of the latch circuit 105, the control circuit 109 and the detecting circuit 108 are explained. The elements which are basically identical to the corresponding ones in FIG. 3 are designated by the same numerals.

The strobe pulse $P_2$ from the operational processing circuit 104 is applied to one terminal 31 of an OR gate OR 101 which produces the second output OUT 2. The first output OUT 1 is produced by an OR gate OR 2.

When an output of an AND gate AND 2 assumes the "L" level, a monostable multivibrator MONO 2 produces an "H" level output at its output terminal Q and an "L" level output at its output terminal $\bar{Q}$, for the time period $T_2$. The output at the output terminal $\bar{Q}$ of the multivibrator MONO 2 is applied to a set-reset flip-flop FF1 comprising NOR gates NOR 101 and NOR 102, and the output at the output terminal Q is supplied to a motor control output terminal 35. When the signal at the motor control output terminal 35 assumes the "H" level, an electromagnetic brake circuit (not shown) is actuated to shunt the motor M. Accordingly, the multivibrator MONO 2 functions as a motor stopping brake timer circuit. The output at the output terminal Q of the multivibrator MONO 2 is used as the third output OUT 3 and also as the brake output OUT 4. A timing control circuit comprising a capacitor C and a resistor R is connected between the output of the OR gate OR 2 and the input of the NOR gate NOR 102.

The operation of the circuit is now briefly explained. Let us assume that the parallel output data from the latch circuit D-Latch 1 and the counter Counter 1 are equal, the output of the OR gate OR 2 is at the "L" level and the output Q of the multivibrator MONO 2 is at the "L" level while the output $\bar{Q}$ thereof is at the "H" level. Thus, the output of the NOR gate NOR 102 is "H" which is inverted by an inverter NOT 101 to the "L" level signal. Consequently, the strobe pulse $P_2$ from the terminal 31 is enabled. Accordingly, if the focus error signal Sig-1 and the front/rear focus signal Sig-2 are supplied together with the strobe pulse $P_2$, the latch circuits D-Latch 1 and D-Latch 2, the multivibrator MONO 1, the counters Counter 1 and Counter 2 and the exclusive OR gates EXOR 1-EXOR 4 are activated in the same manner as in FIG. 3 so that when the focus error is present the output of the OR gate OR 2 assumes the "H" level to prevent the strobe pulse from passing through the OR gate OR 101 and inhibit the subsequent latching operations of the latch circuits D-Latch 1 and D-Latch 2. The output of the OR gate OR 2 also enables the AND gates AND 3 and AND 4 through the AND gate AND 2.

As the motor M is rotated, the count of the counter Counter 1 reaches the content of the latch circuit D-Latch 1 and the output of the OR gate OR 2 changes from "H" to "L". As a result, the output of the AND gate AND 2 changes to "L" and the multivibrator MONO 2 produces the "H" output at its output terminal Q and the "L" output at its output terminal $\bar{Q}$ for the time period $T_2$. As a result, the outputs of the AND gates AND 3 and AND 4 assume the L levels, respectively, so that the feed to the motor M is stopped. The motor M is electromagnetically braked by the "H"

output at the output terminal Q of the multivibrator MONO 2 so that the motor M rapidly stops.

On the other hand, the timing control circuit functions in the following manner. A time at which the "L" output of the OR gate OR 2 after it has changed from "H" to "L" is applied to the NOR gate NOR 102 is retarded relative to a time point at which the "L" output at the output terminal $\bar{Q}$ of the multivibrator MONO 2 is applied to the NOR gate NOR 102. As a result, the OR gate OR 101 is prevented from enabling the strobe pulse before the electromagnetic brake is applied to the motor M.

After the brake period $T_2$, the output at the output terminal $\bar{Q}$ of the multivibrator MONO 2 changes from "L" to "H". The NOR gate NOR 102 thus produces the "H" output to allow the OR gate OR 101 to pass through the strobe pulse. Accordingly, the latch circuits D-Latch 1 and D-Latch 2 are allowed to read in the subsequent data. On the other hand, since the image sensor 101 is reset by the "H" output at the output terminal Q of the multivibrator MONO 2, it sequentially produces new optical image signals after the time period $T_2$. The operational processing circuit 104 processes the optical image signals to produce the control output which is again applied to the latch circuits D-Latch 1 and D-Latch 2. This operation continues until the "L" input is applied to the terminal 32 of the AND gate AND 2 by the shutter release or focus lock operation.

In the embodiments described above, the latch circuit D-Latch 1 receives the focus error signal (the amount of drawout of lens) and the counters Counter 1 and Counter 2 receive the relative change of the amount of the draw-out of lens, but the present invention is not limited to the specific embodiments. For example, the latch circuit D-Latch 1 may receive a first distance signal indicative of a distance to an object and the counters Counter 1 and Counter 2 may receive a second distance signal indicative of a position of the lens. In this case, the direction of the lens movement is determined by the magnitudes of the first and second distance signals, and latched in the latch circuit D-Latch 2. The operational processing circuit 4 or 104 may be prevented from reading in the output of the image sensor or the image sensor may be prevented from generating the image signal until the control of the lens movement is completed.

In the illustrated embodiments, the lens is driven by the servo control system in which the amount of rotation of the motor is detected and the displacement is fed back. When the lens is driven by a pulse motor, the feedback loop is not necessary. The present invention is equally applicable to the system which does not need the detection of the displacement.

Figure 7:
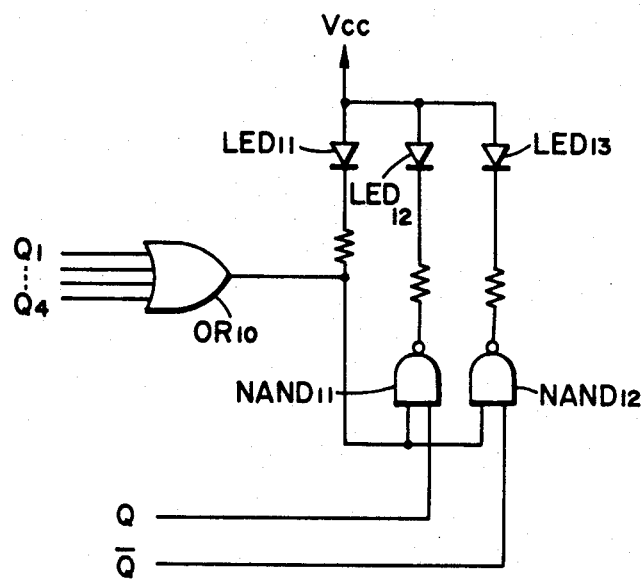
FIG. 7 shows an embodiment of a focusing indicator.
Figure 8:
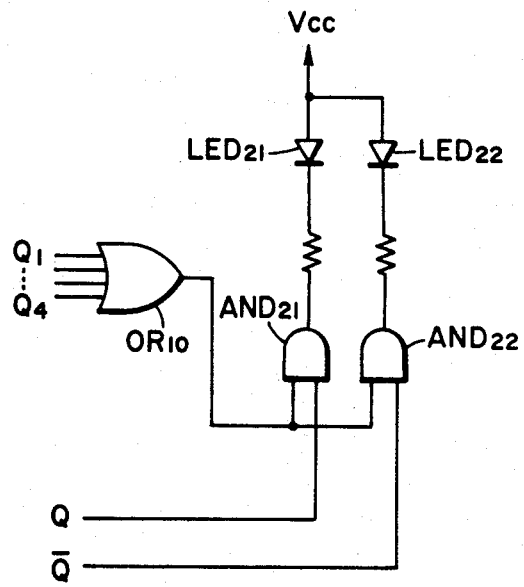
FIG. 8 shows another embodiment of the focusing indicator.

FIGS. 7 and 8 show different embodiments of the lens focusing indicator circuits.

Referring to FIG. 7, OR gate OR 10 receives the parallel outputs of the latch circuit D-Latch 1. When all of the parallel outputs of the latch circuit D-Latch 1 are "L" in the focused condition, the OR gate OR 10 produces an "L" output to fire a light emitting diode LED 11. Since NAND gates NAND 11 and NAND 12 produce "H" outputs, light emitting diodes LED 12 and LED 13 are not fired. On the other hand, in the case of front focus, the $\bar{Q}$-output of the latch circuit D-Latch 2 assumes the "H" level and the OR gate OR 10 produces the "H" output. As a result, the NAND gate NAND 12 produces the "L" output to fire the light emitting diode LED 13. In the case of rear focus, the Q-output of the latch circuit D-Latch 2 assumes the "H" level so that the NAND gate NAND 11 produces the "L" output to fire the light emitting diode LED 12.

FIG. 8 shows another embodiment in which two light emitting diodes LED 21 and LED 22 are used to indicate the focused condition, the front focus and the rear focus. In the focused condition, the OR gate OR 10 produces the "L" output and AND gates AND 21 and AND 22 produce the "L" outputs. As a result, the light emitting diodes LED 21 and LED 22 are fired. On the other hand, in the case of front focus, the Q-output of the latch circuit D-Latch 2 assumes the "L" level so that the light emitting diode LED 21 is fired. In the case of rear focus, the $\bar{Q}$-output of the latch circuit D-Latch 2 assumes the "L" level so that the light emitting diode LED 22 is fired.

FIG. 9 shows an embodiment of a circuit in which the brake output OUT 4 is used to start the charge storage of the image sensor. The circuit of FIG. 8 is substantially identical to the circuit shown in FIG. 6 except that the OR gate OR 101 for inhibiting the latch pulse, the inverter NOT 101, the NOR gates NOR 101 and NOR 102, the capacitor C and the resistor R have been removed and a timer circuit comprising inverters NOT 201 and NOT 202, a counter Counter 3 and an OR gate OR 201 has been added. The operation of the circuit is explained below. The inverters NOT 201 and NOT 202 and the associated capacitor and resistor form an oscillation circuit. The output of the oscillation circuit is counted by the counter Counter 3 which produces a timer pulse after a predetermined time period. Unlike the embodiments shown in FIGS. 4 and 6, the $\bar{Q}$-output of the multivibrator MONO 2 resets the image sensor 101 and starts the charge storage. That is, the signal line from the AGC circuit 110 to the reset terminal R of the shift register SR has been eliminated. The Q-output of the multivibrator MONO 2 is used to reset the counter Counter 3. As a result, the counter Counter 3 is normally reset before the timer pulse is produced. Accordingly, the image sensor is reset at the end of the brake output and the image sensor then starts to store the charge. However, when the lens is focused to the object by the lens drive operation, the focus error becomes zero and the output of the OR gate OR 2 remains at the "L" level. In this case, the counter Counter 3 is not reset and it produces the timer pulse the predetermined time after the previous reset, and the multivibrator MONO 2 is triggered by the falling edge of the timer pulse through the OR gate OR 201. Accordingly, the multivibrator MONO 2 resets the counter Counter 3 and also resets the image sensor and the storage of the charge is started from the end of the brake output. In this manner, by the provision of the timer circuit, the image sensor 101 can be automatically reset after the focused condition has been attained, and the electromagnetic brake for the motor M, the reset of the image sensor 101 and the following start of the charge storage are linked together.

I claim:
1. An apparatus for focusing a focusing optical system to an object comprising:
    (a) photoelectric converter means including a photoelectric cell array having a plurality of photosensor cells each capable of storing charge in accordance with a quantity of incident light, said photoelectric cell array being arranged on an effective focal plane of said optical system, said photoelectric converter means sequentially producing the charges stored in said photoelectric cells;

(b) means for determining a positional relation between said object and said optical system based on said sequential charge outputs to produce a control output to indicate a displacement of said optical system necessary to attain focused condition;

(c) store means for storing said control output;

(d) drive means responsive to said control output stored in said store means for moving said optical system; and (e) control means for permitting said store means to store only the control output produced based on the sequential outputs produced when said optical system is stationary.

2. An apparatus for focusing a focusing optical system to an object according to claim 1 wherein said control means includes detecting means for detecting the movement of said optical system by said drive means.

3. An apparatus for focusing a focusing optical system to an object according to claim 2 wherein said control means includes means for resetting said photoelectric cells when said detecting means detects the completion of the movement of said optical system.

4. An apparatus for focusing a focusing optical system to an object according to claim 2 wherein said control means includes first means for resetting said photoelectric cells when said detecting means detects the completion of the movement of said optical system and second means having timer means for resetting said photosensitive cells a predetermined time after the reset by said first means.

5. An apparatus for focusing a focusing optical system to an object according to claim 2 wherein said control output indicates an amount of displacement of said optical system necessary to attain the focused condition, said control means includes counter means for counting the amount of displacement attained by said optical system, and said control means permits the store operation of said store means when the count of said counter means becomes equal to said control output.

6. An apparatus for focusing a focusing optical system to an object according to claim 1 wherein said control means controls the store operation of said store means.

7. An apparatus for focusing a focusing optical system to an object according to claim 6 wherein said control means includes means for preventing said store means from storing the control output produced when said optical system is being moved.

8. An apparatus for focusing a focusing optical system to an object according to claim 1 wherein said photoelectric converter means includes a circuit for controlling charge storage times of said photoelectric cells such that said sequential outputs are kept constant irrespective of the amounts of charges stored.

9. An apparatus for focusing a focusing optical system an object comprising:

(a) photoelectric converter means including a photoelectric cell array having a plurality of photosensor cells each capable of storing charge in accordance with a quantity of incident light, said photoelectric cell array being arranged on an effective focal plane of said optical system, said photoelectric converter means sequentially producing the charges stored in said photoelectric cells;

(b) means for determining a positional relation between said object and said optical system based on said sequential charge outputs to produce a control output to indicate a displacement of said optical system necessary to attain focused condition;

(c) store means for storing said control output;

(d) drive means responsive to said control output stored in said store means for moving said optical system; and (e) means for controlling at least one of said photoelectric converter means, said determining means and said store means so as to stored into said store means only the control output produced based on the sequential outputs produced when said optical system is stationary.

* * * * *

UNITED STATES PATENT AND TRADEMARK OFFICE
CERTIFICATE OF CORRECTION

PATENT NO. : 4,414,469
DATED : November 8, 1983
INVENTOR(S) : AKIRA OGASAWARA

It is certified that error appears in the above-identified patent and that said Letters Patent is hereby corrected as shown below:

In the Headnote, item [30], line 2, "56-130696" should read --56-130496--.

Column 7, line 46, "cotrol" should be --control--.

Column 8, line 64, "Q" (second occurrence) should be --$\bar{Q}$--.

Signed and Sealed this

Third Day of January 1984

[SEAL]

Attest:

GERALD J. MOSSINGHOFF

Attesting Officer

Commissioner of Patents and Trademarks